(12) United States Patent
Mueller et al.

(10) Patent No.: US 12,491,938 B2
(45) Date of Patent: Dec. 9, 2025

(54) MEASUREMENT OF DRIVER TORQUE AND STEERING ANGLE IN A TORQUE OVERLAY STEERING SYSTEM

(71) Applicant: KNORR-BREMSE Systeme fuer Nutzfahrzeuge GmbH, Munich (DE)

(72) Inventors: Jens-Hauke Mueller, Velbert-Neviges (DE); Sven Kirschbaum, Mettmann (DE)

(73) Assignee: KNORR-BREMSE Systeme fuer Nutzfahrzeuge GmbH, Munich (DE)

(*) Notice: Subject to any disclaimer, the term of this patent is extended or adjusted under 35 U.S.C. 154(b) by 114 days.

(21) Appl. No.: 18/286,950

(22) PCT Filed: Mar. 11, 2022

(86) PCT No.: PCT/EP2022/056326
§ 371 (c)(1),
(2) Date: Oct. 13, 2023

(87) PCT Pub. No.: WO2022/218623
PCT Pub. Date: Oct. 20, 2022

(65) Prior Publication Data
US 2024/0190502 A1    Jun. 13, 2024

(30) Foreign Application Priority Data

Apr. 16, 2021 (DE) .................... 10 2021 109 647.2

(51) Int. Cl.
*B62D 6/10* (2006.01)
*B62D 5/04* (2006.01)
*B62D 5/083* (2006.01)

(52) U.S. Cl.
CPC ............. *B62D 6/10* (2013.01); *B62D 5/0409* (2013.01); *B62D 5/046* (2013.01); *B62D 5/083* (2013.01)

(58) Field of Classification Search
CPC ........ B62D 6/10; B62D 5/0409; B62D 5/046; B62D 5/083; B62D 15/0215; B62D 15/0235
See application file for complete search history.

(56) References Cited

U.S. PATENT DOCUMENTS 6,427,542 B1 * 8/2002 Nicot ...................... G01L 5/221
  73/862.08
2010/0070136 A1   3/2010 Williams et al.
(Continued)

FOREIGN PATENT DOCUMENTS

CN         203753162 U  *  8/2014
CN         108791478 A  *  11/2018
(Continued)

OTHER PUBLICATIONS

International Search Report (PCT/ISA/210) issued in PCT Application No. PCT/EP2022/056326 dated Jun. 28, 2022 with English translation (4 pages).
(Continued)

*Primary Examiner* — Joseph J Dallo
(74) *Attorney, Agent, or Firm* — Crowell & Moring LLP

(57) ABSTRACT

A method for determining a driver torque of a power steering assembly for an electrohydraulic power steering system of motor vehicles, includes an input shaft for introduction of a driver torque, an output shaft for driving a steering linkage and a torsion bar between the input shaft and the output shaft for actuation of a rotary slide valve, an electric drive for electrical steering assistance, and a control unit for controlling the electric drive. The power steering assembly has a sensor arrangement on the torsion bar for actuation of the rotary slide valve. An actual torque is determined with the aid of the sensor arrangement. The control unit determines a driver torque with the aid of the actual torque.

19 Claims, 1 Drawing Sheet

(56) References Cited

U.S. PATENT DOCUMENTS

| | | | | |
|---|---|---|---|---|
| 2012/0290175 | A1* | 11/2012 | Hisanaga | B62D 5/065 701/41 |
| 2014/0074355 | A1 | 3/2014 | Kim et al. | |
| 2016/0114832 | A1* | 4/2016 | Taniguchi | B62D 6/04 701/41 |
| 2018/0111643 | A1 | 4/2018 | Kim et al. | |
| 2019/0322315 | A1 | 10/2019 | Birsching et al. | |
| 2022/0126912 | A1* | 4/2022 | Uchida | B62D 5/30 |

FOREIGN PATENT DOCUMENTS

| | | | | |
|---|---|---|---|---|
| DE | 10 2014 106 488 | A1 | 11/2015 | |
| DE | 10 2014 106 493 | A1 | 11/2015 | |
| DE | 10 2017 219 161 | A1 | 4/2018 | |
| DE | 11 2009 002 028 | B4 | 11/2020 | |
| DE | 102021109647 | A1 * | 10/2022 | ........... B62D 5/0409 |
| WO | WO-9504219 | A1 * | 2/1995 | ............... B62D 5/06 |
| WO | WO-2016132854 | A1 * | 8/2016 | ............... B62D 5/00 |
| WO | WO-2017068896 | A1 * | 4/2017 | ............... B62D 6/00 |
| WO | WO-2018050568 | A1 * | 3/2018 | ............. B62D 5/065 |
| WO | WO-2022218623 | A1 * | 10/2022 | ........... B62D 5/0409 |
| WO | WO-2023046355 | A1 * | 3/2023 | ........... B62D 5/0403 |

OTHER PUBLICATIONS

German-language Written Opinion (PCT/ISA/237) issued in PCT Application No. PCT/EP2022/056326 dated Jun. 28, 2022 with English translation (8 pages).

German-language Office Action issued in German Application No. 10 2021 109 647.2 dated Nov. 4, 2021 (6 pages).

International Preliminary Report on Patentability (PCT/IB/326 & PCT/IB/373) issued in PCT Application No. PCT/EP2022/056326 dated Oct. 26, 2023, including English translation of document C2 (German-language Written Opinion (PCT/ISA/237), filed on Oct. 13, 2023) (6 pages).

* cited by examiner

MEASUREMENT OF DRIVER TORQUE AND STEERING ANGLE IN A TORQUE OVERLAY STEERING SYSTEM

BACKGROUND AND SUMMARY

The invention relates to a method for determining a driver torque of a power steering assembly for an electrohydraulic power steering system of a motor vehicle and to a low-floor vehicle for executing such a method, as well as to a power steering assembly for an electrohydraulic power steering system.

Hydraulically, electrically or electrohydraulically assisted power steering systems are known for assisting steering of motor vehicles. Such power steering systems are used, inter alia, in lightweight and heavy utility vehicles such that the rotational movement of a steering wheel is transmitted, depending on the design, either directly or indirectly via a linkage to track rods.

Power steering systems of this kind have been known for a long time and are available in a variety of designs. For example, DE 10 2014 106 488 A1 and DE 10 2014 106 493 A1 describe power steering systems in which the steering assistance is provided using hydraulics.

Here, the electrohydraulic power steering systems are equipped with a variety of sensor combinations such as, for example, a "torque and angle sensor" (TAS sensor) in order to be able to differentiate between what torque is introduced into the steering system by the driver using the steering wheel and what torques originate from, for example, the electrical steering assistance system. A TAS sensor generally comprises angle sensors for determining a differential angle between the steering wheel or its input shaft into the power steering system and a shaft of the electric drive of the electrical steering assistance system. Here, the electric drive is connected to the input shaft via a torsion bar, so that a relative rotation between the input shaft and the electric drive is possible. Therefore, the torque that the driver introduces into the power steering system can be determined with the aid of the characteristic of the torsion bar and the differential angle.

An electrohydraulic power steering system comprises a hydraulic steering assistance system in addition to the electrical assistance system. For this purpose, a hydraulic steering assistance system is connected in series with the output of the electrical steering assistance system. The hydraulic steering assistance system likewise comprises two shafts, which are connected by a torsion bar. The two shafts form, together with the torsion bar, a rotary slide valve, which is used for controlling the hydraulic fluid. The more the two shafts are rotated in relation to one another, the further the rotary slide valve is opened and the greater the hydraulic assistance provided to the steering system.

However, such power steering systems comprise a very large number of components and sensors, and are therefore complicated to produce and maintain. In addition, more installation space is required than for a purely hydraulic power steering system.

The object of the present invention is therefore to provide an electrohydraulic power steering system for motor vehicles that is improved compared to the prior art and has a considerably simplified design.

With respect to a method for determining a driver torque of a power steering assembly for an electrohydraulic power steering system of motor vehicles, to a low-floor vehicle for executing such a method, and to a power steering assembly for an electrohydraulic power steering system, the object according to the invention is achieved by the features of the independent claims. Advantageous further refinements are specified in the respective dependent claims.

It is essential for the invention that the torsion bar for actuating the rotary slide valve is used for determining the driver torque, the torsion bar being present in any case on account of the hydraulic steering assistance system, and no additional torsion bar is required for determining the driver torque.

As a result, a large number of mechanical components, such as an additional torsion bar, a further shaft, bearings etc., can be saved. Owing to the use of further resources, such as, for example, a motor sensor which is generally present on modern electric motors, and the use of a special control system, the number of additionally required sensors for determining the driver torque can be minimized.

Furthermore, it has been found that such an arrangement can be used to form particularly compact electrohydraulic power steering assemblies which are of particular interest in the case of tight space conditions, as are found in low-floor vehicles, for example.

It should be noted that the features individually presented in the claims can be combined with one another in any technically meaningful manner (even across category limits, for example between method and device) and show further refinements of the invention. The description characterizes and specifies the invention additionally in particular in connection with the figures.

The method according to the invention serves to determine a driver torque of a power steering assembly for an electrohydraulic power steering system of motor vehicles. According to the invention, the power steering assembly comprises an input shaft for introducing a driver torque, an output shaft for driving a steering linkage and a torsion bar between the input shaft and the output shaft for actuating a rotary slide valve, an electric drive for electrical steering assistance, and a control unit for controlling the electric drive.

The method according to the invention makes provision for a sensor arrangement of the power steering assembly to determine an actual torque with the aid of the torsion bar for actuating the rotary slide valve, and for the control unit to determine a driver torque based on the actual torque.

The input shaft is connected to a direction-selecting element of the motor vehicle. The direction-selecting element is generally a steering wheel and connected to the input shaft via a steering column. By turning the steering wheel the driver introduces a torque—the driver torque—into the power steering assembly via the input shaft. Once power assistance has been performed, the force is passed on via the output shaft to a steering linkage for changing the direction of the vehicle.

The input shaft is connected to the output shaft via a torsion bar. This assembly is embodied as a rotary slide valve for the hydraulic steering assistance system. This means that the input shaft can be rotated relative to the output shaft, with a valve opening being opened and closed by the rotation, the hydraulic fluid then being controlled via the valve opening. The hydraulic fluid then serves for hydraulic steering assistance.

For additional electrical steering assistance or steering influencing, an electric drive can be coupled to the input shaft. However, coupling to the output shaft or other shafts which are non-positively connected to the steering linkage is also feasible. The driver torque, amongst other things, is generally determined in order to control the electric drive. The driver torque is determined with the aid of the sensor arrangement which monitors the torsion bar for actuating the rotor slide valve. If the driver actuates the steering wheel, a differential angle between the input shaft and the output shaft is initially established. This differential angle can be converted, together with the characteristic of the torsion bar, into the actual torque. The actual torque is the torque that is actually applied to the steering linkage. The actual torque may be made up of several components. It is generally made up of the driver torque and the torques from the various steering assistance systems and is directed against the steering resistances of the vehicle. The actual torque can be converted into the driver torque taking into account the prevailing torques and especially the torque of the electric drive introduced into the driver torque. This value is then used to control the electric drive.

The electric drive preferably comprises an electric motor and a gear mechanism. The electric motor is preferably fitted with an internal motor sensor which measures and outputs motor characteristic data. This motor characteristic data can include the motor current, the angle of the motor shaft, the voltage or similar values. The gear mechanism is not fixed to a particular design and may be implemented in the form of a spur gear mechanism, a planetary gear mechanism, a worm gear mechanism or a helical gear mechanism. Other types of gear mechanism may well be expedient.

According to one design variant of the method, the method is characterized in that the driver torque is also determined based on an assistance torque output by the electric drive. For electrical steering assistance in particular operating states, the driver torque has to be known in order to implement the control of the electric motor providing assistance. Therefore, the torque, for example, of the electric motor—that is to say the assistance torque—is usually known or can be estimated, and therefore this torque can be used for calculating the driver torque.

In a preferred design variant, the method is characterized in that the sensor arrangement uses a TAS system for determining the driver torque. A TAS system is a sensor arrangement called a "torque and angle sensor" and generally comprises a plurality of angle sensors with which the torque and the steering angle are measured. A TAS system is attached to the interface between two shafts and monitors these two shafts. Here, the TAS system is attached to the interface between the input shaft and the output shaft and, as is usually customary, does not require an additional intermediate shaft with an additional torsion bar. The torque, the differential angle and the absolute angle of the two shafts can be measured with the aid of the sensors of the TAS system. The TAS system is preferably configured to measure a differential angle between the input shaft and the output shaft and the resulting torque on the torsion bar, an absolute angle of the input shaft and/or an absolute angle of the output shaft. The number of sensors is not fixed to the abovementioned sensors here. Rather, the number and type of sensors used can be selected such that both the angles and the torque can be measured. Therefore, the TAS system of the sensor arrangement preferably comprises a plurality of sensors, such as torque sensors and/or angle sensors and/or sensors for detecting the number of revolutions of the input shaft, with the objective of reliably and precisely detecting the torque and the angles in accordance with the application. Therefore, the sensor arrangement preferably uses a plurality of sensors for determining the actual torque, specifically in particular torque sensors and/or angle sensors and/or sensors for the number of revolutions of the input shaft. The number of revolutions of the input shaft is therefore of interest since this usually corresponds to the number of revolutions of the steering wheel. The TAS system preferably comprises a torque sensor for determining the actual torque and/or an absolute angle sensor.

According to a further preferred design variant, the method is characterized in that the sensor arrangement uses only one sensor for determining the actual torque, the sensor being embodied as an angle sensor, wherein determining the driver torque is determined from the data from the angle sensor and the data from a motor sensor, included in the electric drive, for monitoring an electric motor of the electric drive. With suitable calculation of the driver torque, it is possible to limit the sensor arrangement to one angle sensor. The angle sensor is preferably configured for ascertaining a differential angle between the input shaft and the output shaft. For such calculation of the driver torque, the differential angle between the input shaft and the output shaft is detected by the sensor arrangement and combined with the measurement data from the motor sensor. The motor sensor is preferably likewise an angle sensor. This angle sensor can be called the motor angle sensor. In this way, both the driver torque can be determined from the differential angle and the characteristic of the torsion bar for actuating the rotary slide valve and the rotation position of a motor shaft of the electric motor can be determined from the angle sensor of the motor sensor of the electric motor.

According to a further preferred embodiment, the method is characterized in that the sensor arrangement detects the actual torque in a redundant manner. Redundant detection of the actual torque means that the actual torque is detected based on two different measurement values. This is preferably done by redundant sensor design. Since an intervention in the steering system of a motor vehicle is a safety-related, it is advisable to design the sensor arrangement in a redundant manner. In the simplest case, this can be done by the sensors of the sensor arrangement being provided in duplicate. However, it may also be expedient to provide different types of sensors for the same measurement value. Therefore, a measurement error, which would occur due to external circumstances with a particular type of sensor, can be detected. Provision can be made for the electric drive to be switched to a passive mode or to be moved to a safe mode in the case of unambiguous measurement values.

In a preferred design variant, the method is characterized in that the sensor arrangement is configured such that the actual torque is determined using a differential angle. Determining the actual torque using a differential angle is advisable since the actual torque can be calculated with the aid of the characteristic of the torsion bar in this way.

In a further preferred design variant, the method is characterized in that the sensor arrangement detects a differential angle between the input shaft and the output shaft for calculating the actual torque.

According to a preferred embodiment, the method is characterized in that the sensor arrangement detects a differential angle between a motor shaft of an electric motor of the electric drive and the output shaft for calculating the driver torque. This differential angle is suitable for calculation since the angle of the motor shaft is known by the motor sensor in any case and only the angle of the output shaft has to be detected in addition.

According to a further preferred embodiment, the method is characterized in that the sensor arrangement detects a differential angle between a shaft of a gear mechanism of the electric drive and the output shaft for calculating the driver torque. It may also be the case that the sensor arrangement is configured such that a differential angle between a shaft of a gear mechanism of the electric drive and the input shaft is detected for calculating the driver torque. Depending on the application, it may be necessary to connect a gear mechanism upstream of the output shaft in order to increase either the force or the speed. Since a gear mechanism permits substantially no differential angle between the individual gear mechanism shafts, it is also possible to determine the differential angle for determining the driver torque with the aid of a shaft in the gear mechanism and not necessarily directly at the input or output shaft of the power steering assembly. The gear mechanism preferably comprises a worm gear mechanism.

In a preferred design variant, the method is characterized in that the sensor arrangement detects a differential angle between a motor shaft of an electric motor of the electric drive and the input shaft for calculating the driver torque. A gear mechanism or at least a non-positive connection is generally located between the motor shaft and the input shaft. This permits substantially no play between the motor shaft and the input shaft, and therefore the differential angle can be determined with the aid of the transmission ratio of the gear mechanism or the non-positive connection for determining the driver torque.

A preferred embodiment of the method is characterized in that the electric drive, for steering assistance, exerts a motor torque on the input shaft. The electric drive preferably engages with the input shaft. In this case, the motor torque is therefore transmitted directly from the electric drive to the input shaft.

This motor torque can likewise be used for ascertaining the driver torque. A further preferred embodiment of the method is accordingly characterized in that the control unit also determines the driver torque based on the motor torque.

In principle, the motor torque can be ascertained in any desired manner. According to a preferred embodiment of the method, provision is made for the control unit to ascertain the motor torque based on a measurement of a motor current for operating the electric drive. In particular, the measured motor current may be a motor current for operating the electric motor. However, other variables and, in particular, other measurement variables can also be used for ascertaining the motor torque.

In a further preferred design variant, the method is characterized in that the sensor arrangement detects a steering angle with multiturn capability from the angle of a motor shaft of an electric motor of the electric drive and the angle of the output shaft. A steering angle with multiturn capability is a steering angle which, in the event of more than one complete revolution of the steering wheel, also clearly defines where the steering wheel is located. This can be, for example, an angle indication of 0 to 360° in combination with an indication of the already completed full revolutions, or an angle indication which does not begin again at 0° beyond 360°, but rather continues to count upward. Such angle sensors usually comprise a plurality of sensors which are able to output the desired steering angle with multiturn capability. In order to render additional sensors superfluous, the motor sensor of the electric motor can be used in order to determine the required information. The steering angle with multiturn capability is preferably detected with the aid of the Nonius principle. The Nonius principle is known from, for example, measuring slides and other measuring devices. In the case of the power steering assembly, the principle can be used by way of the angle of the motor sensor, which runs from 0 to 360°, in combination with the transmission ratio being compared with the angle of the input shaft, which likewise runs from 0 to 360°. This results, depending on the transmission ratio, for example for a motor angle of 73° and an angle of the input shaft of 169°, in the steering wheel having to be in the first revolution, whereas, given a motor angle of 17° and an angle of the input shaft of 169°, the steering wheel has to be in the second revolution.

According to a preferred embodiment, the method is characterized in that the sensor arrangement uses a computer module for calculating the driver torque. Depending on the complexity of the sensor data to be managed, it may be advantageous for the data to be managed by a dedicated computer module and determine the driver torque. A combination of control of the electric drive and processing of the sensor data may also be expedient. The computer module is preferably configured for controlling the electric drive. Other combinations of control devices or data processing modules may be expedient.

According to a further preferred embodiment, the method is characterized in that the sensor arrangement passes on the detected measurement values from the sensors to a module which is present in the motor vehicle for calculating the driver torque. In order to avoid a further control device, processing of the sensor data can be performed by a module already contained in the motor vehicle. This module may be, for example, a module that controls an autonomous driving mode or is already tasked with steering functions. However, any other module with available capabilities can also be used.

The low-floor vehicle according to the invention is characterized in that it comprises a power steering assembly for executing the method according to the proposal.

The power steering assembly according to the invention is designed for an electrohydraulic power steering system of motor vehicles and comprises an input shaft for introducing a driver torque, an output shaft for driving a steering linkage and a torsion bar between the input shaft and the output shaft for actuating a rotary slide valve, an electric drive for electrical steering assistance, and a sensor arrangement which is configured to determine an actual torque with the aid of the torsion bar for actuating the rotary slide valve.

The power steering assembly according to the invention is characterized in that the control unit is configured to determine a driver torque based on the actual torque.

Further advantages and features of the method according to the invention, the low-floor vehicle and the power steering assembly result from the dependent claims which relate to advantageous refinements of the present invention and as such are not to be understood to be restrictive. The invention also encompasses combinations of the features of different dependent claims where technically possible, even if the dependent claims do not relate to one another or if they belong to different claim categories. This is also true of the individual features of the exemplary embodiments discussed hereinafter to the extent that the person skilled in the art is unable to recognize these as necessarily belonging together.

The exemplary embodiments described below are intended to explain the invention in more detail for the person skilled in the art. The exemplary embodiments are explained with reference to the appended drawings.

DETAILED DESCRIPTION OF THE DRAWINGS

Figure 1:
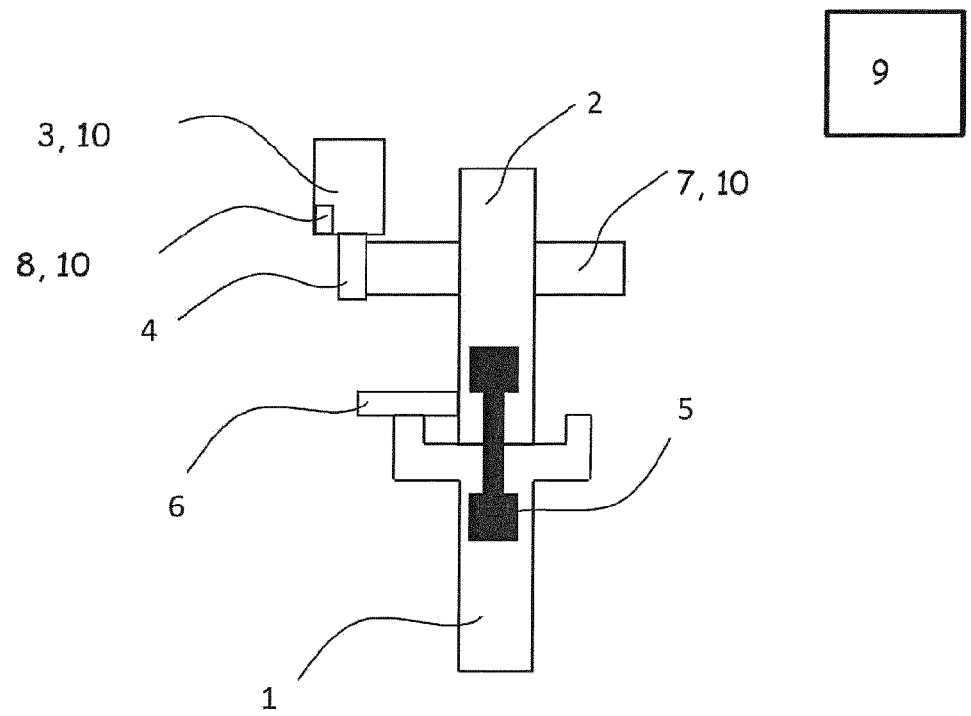
FIG. 1 is a schematic diagram of a first design variant of a power steering assembly according to the invention for executing the method according to the invention.

FIG. 1 shows a first design variant of the power steering assembly for transmitting a steering movement from a steering wheel (not illustrated) to a steering linkage (likewise not illustrated). This design variant in FIG. 1 can also execute the method according to the invention.

The driver torque is introduced via the steering wheel into the power steering assembly by the input shaft 2. The gear mechanism 7 of the electric drive 10 is connected to the input shaft 2, the gear mechanism 7 being a worm gear mechanism here. The electric drive 10 further comprises the electric motor 3 having a motor shaft 4 and a motor sensor 8 here. The torsion bar 5 connects the input shaft 2 to the output shaft 1 in such a way that it permits a certain rotational movement between the two. This is necessary since the input shaft 2 and the output shaft 1 form a rotary slide valve, which serves to control the hydraulic steering assistance system (not illustrated here). Owing to rotation of the input shaft 2 in relation to the output shaft 1, valves which actuate the hydraulic steering assistance system are actuated. As soon as the input shaft 2 and the output shaft 1 have a differential angle of substantially 0°, the steering linkage is in the position desired by the driver and the hydraulic steering assistance system does not introduce any more force into the power steering assembly. The sensor arrangement 6 is located at the interface between the input shaft 2 and the output shaft 1, the sensor arrangement detecting, by way of example, the differential angle between the input shaft 2 and the output shaft 1 here, this differential angle in turn being used to determine the driver torque.

Figure 2:
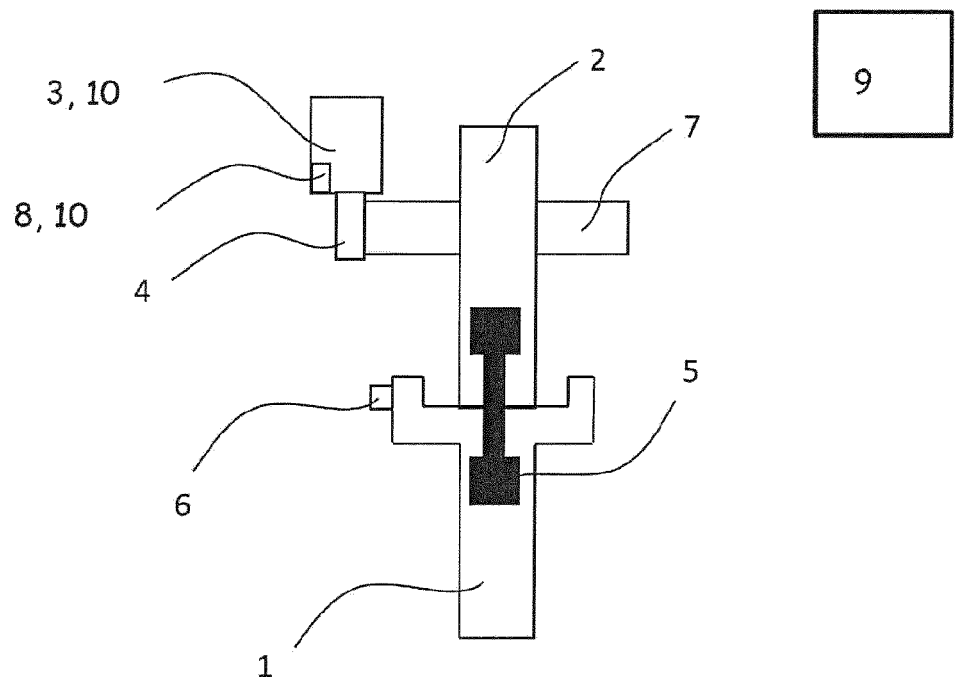
FIG. 2 is a schematic diagram of a second design variant of the power steering assembly according to the invention for executing the method according to the invention.

The exemplary embodiment depicted in FIG. 2 shows the power steering assembly, which is substantially identical to that in FIG. 1, with the difference that the sensor arrangement comprises only one angle sensor which—in contrast to the sensor arrangement 6 in FIG. 1 that detects the differential angle—detects the absolute angle of the output shaft 1.

It is true for both exemplary embodiments that the driver of the vehicle operates the steering system in a manual driving mode. For this purpose, the driver turns the steering wheel in order to specify the desired direction of travel of the vehicle. This rotational movement of the steering wheel is transmitted to the input shaft 2. As a result, the electric drive 10 also rotates at the same time. Owing to the movement of the electric drive 10, the angle of the motor shaft 4 and therefore also the angle of the input shaft 2, taking into consideration the transmission ratio of the gear mechanism 7, can be determined by the motor sensor 8. Therefore, the position in which the steering wheel is located is known and the direction that the driver wishes to steer the vehicle is known.

In addition to the applied driver torque, the electric motor 10 can apply a motor torque. The motor torque can be directed such that the rotational movement by the driver is assisted, or it can be directed oppositely, so that the driver has to apply an increased torque. The steering sensation for the driver can be influenced in this way.

Owing to the rotation of the input shaft 2, a differential angle between the input shaft 2 and the output shaft 1 is initially established since the torsion bar 5 elastically connects the input shaft 2 to the output shaft 1, and the output shaft 1 generally counteracts the rotation by, for example, frictional forces of the wheels. The differential angle is established depending on the steering resistance of the wheels or the steering mechanism, which is directly connected to the output shaft 1.

In the exemplary embodiment of FIG. 1, the differential angle is directly detected by the sensor arrangement 6. In the exemplary embodiment of FIG. 2, the differential angle is ascertained by way of the angle of the input shaft 2 also being known by the motor sensor 8, in addition to the absolute angle of the output shaft 1 being known by the sensor arrangement 6. Since the input shaft 2 and the output shaft 1 are connected by means of the torsion bar 5 in both exemplary embodiments, the actual torque can be determined in both cases of the torsion bar 5.

The greater the driver torque in connection with the torque of the electric drive—that is to say the motor torque —, the greater is this differential angle too. The rotation of the input shaft in relation to the output shaft leads to the hydraulic valves opening, so that a hydraulic steering assistance system introduces an additional torque into the power steering assembly and assists the driver in turning the steering wheel. The hydraulic steering assistance system intervenes at a point downstream of the torsion bar 5, such as the output shaft 1 for example. The magnitude of the hydraulically introduced torque depends significantly on the size of the differential angle. As soon as the hydraulic steering system has rotated the output shaft 1 to such an extent that the differential angle becomes smaller, the hydraulic valves close again and the hydraulic torque becomes lower. If the differential angle is close to zero, the valves are also substantially closed and the hydraulic steering assistance is no longer provided.

The magnitude of the electrically introduced motor torque can initially be controlled freely of the control system of the electric drive 10. However, during manual operation, it is advisable to use control taking into consideration the differential angle and also the measurement variables of the motor sensor 8. The magnitude of the motor torque can be determined by means of the motor sensor 8 by way of the motor voltages or motor currents for operating the electric motor 3 being detected. This motor torque can be offset together with the detected actual torque of the sensor arrangement 6, so that the driver torque can be determined. The torques now known can then be used to draw conclusions about the extent to which the electrical steering assistance system should intervene.

In an autonomous driving mode, the hydraulic steering assistance system reacts and assists in the same way as in the manual mode. The required differential angle for controlling the hydraulics system is again achieved by rotating the input shaft 2 relative to the output shaft 1, but the electrically introduced torque—that is to say the motor torque—acts on the input shaft 2 and leads to a differential angle. The driver torque is not present and the electric drive 10 can operate the steering system without action by the driver and the movements of the electric drive are assisted by the hydraulic steering assistance system.

LIST OF REFERENCE SIGNS

1 Output shaft
 2 Input shaft
 3 Electric motor
 4 Motor shaft
 5 Torsion bar
 6 Sensor arrangement
 7 Gear mechanism 8 Motor sensor
9 Control unit
10 Electric drive

The invention claimed is:

1. A method for determining a driver torque of a power steering assembly, the method comprising:
providing an electrohydraulic power steering system of a motor vehicle the electrohydraulic power steering system having an input shaft for introducing the driver torque, an output shaft for driving a steering linkage and a torsion bar between the input shaft and the output shaft for actuating a rotary slide valve, an electric drive for electrical steering assistance, and a control unit for controlling the electric drive;
determining, via a sensor arrangement of the power steering assembly, an actual torque using the torsion bar for actuating the rotary slide valve; and
determining, via the control unit, the driver torque based on the actual torque, wherein the driver torque is also determined based on an assistance output by the electric drive.

2. The method as claimed in claim 1, wherein
the sensor arrangement uses a torque and angle sensor (TAS) system for determining the actual torque.

3. The method as claimed in claim 2, wherein the TAS system comprises a torque sensor for determining the actual torque and/or an absolute angle sensor.

4. The method as claimed in claim 1, wherein
the sensor arrangement uses only one sensor for determining the actual torque, the sensor being embodied as an angle sensor, and
wherein determining the driver torque is determined from data from the angle sensor and data from a motor sensor, included in the electric drive, for monitoring an electric motor of the electric drive.

5. The method as claimed in claim 1, wherein
the sensor arrangement detects the actual torque in a redundant manner.

6. The method as claimed in claim 1, wherein
the sensor arrangement is configured such that the actual torque is determined using a differential angle.

7. The method as claimed in claim 1, wherein
the sensor arrangement detects a differential angle between the input shaft and the output shaft for calculating the actual torque.

8. The method as claimed in claim 1, wherein
the sensor arrangement detects a differential angle between a motor shaft of an electric motor of the electric drive and the output shaft for calculating the driver torque.

9. The method as claimed in claim 1, wherein
the sensor arrangement detects a differential angle between a shaft of a gear mechanism of the electric drive and the output shaft for calculating the driver torque.

10. The method as claimed in claim 9, wherein
the gear mechanism comprises a worm gear mechanism.

11. The method as claimed in claim 1, wherein
the sensor arrangement detects a differential angle between a motor shaft of an electric motor of the electric drive and the input shaft for calculating the driver torque.

12. The method as claimed in claim 1, wherein
the electric drive, for steering assistance, exerts a motor torque on the input shaft by engaging with the input shaft.

13. The method as claimed in claim 12, wherein
the control unit also determines the driver torque based on the motor torque.

14. The method as claimed in claim 12, wherein
the control unit ascertained the motor torque based on a measurement of a motor current that operates the electric drive.

15. The method as claimed in claim 1, wherein
the sensor arrangement detects a steering angle with multiturn capability from the angle of a motor shaft of an electric motor of the electric drive and the angle of the output shaft.

16. The method as claimed in claim 1, wherein
the sensor arrangement uses a computer module for calculating the driver torque.

17. The method as claimed in claim 1, wherein
the sensor arrangement passes on detected measurement values to a module which is present in the motor vehicle for calculating the driver torque.

18. A power steering assembly for an electrohydraulic power steering system of a motor vehicle, comprising:
an input shaft for introducing a driver torque;
an output shaft for driving a steering linkage and a torsion bar between the input shaft and the output shaft for actuating a rotary slide valve;
an electric drive for electrical steering assistance;
a control unit for controlling the electric drive; and
a sensor arrangement which is configured to determine an actual torque with the aid of the torsion bar for actuating the rotary slide valve, wherein the control unit is configured to determine a driver torque based on the actual torque and also based on an assistance torque output by the electric drive.

19. A low-floor vehicle comprising a power steering assembly according to claim 18.

* * * * *